United States Patent
Ye et al.

(10) Patent No.: US 10,051,277 B2
(45) Date of Patent: Aug. 14, 2018

(54) METHOD FOR SUB-BLOCK BASED PALETTE CODING

(71) Applicant: MEDIATEK INC., Hsin-Chu (TW)

(72) Inventors: Jing Ye, San Jose, CA (US); Shan Liu, San Jose, CA (US); Xiaozhong Xu, Fremont, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/520,575

(22) PCT Filed: Nov. 6, 2015

(86) PCT No.: PCT/CN2015/094004
§ 371 (c)(1),
(2) Date: Apr. 20, 2017

(87) PCT Pub. No.: WO2016/070845
PCT Pub. Date: May 12, 2016

(65) Prior Publication Data
US 2017/0318302 A1    Nov. 2, 2017

Related U.S. Application Data

(60) Provisional application No. 62/096,918, filed on Dec. 26, 2014, provisional application No. 62/076,135, filed on Nov. 6, 2014.

(51) Int. Cl.
*H04N 19/186* (2014.01)
*H04N 19/119* (2014.01)
*H04N 19/96* (2014.01)

(52) U.S. Cl.
CPC ......... *H04N 19/186* (2014.11); *H04N 19/119* (2014.11); *H04N 19/96* (2014.11)

(58) Field of Classification Search
CPC ..... H04N 19/186; H04N 19/119; H04N 19/96
See application file for complete search history.

(56) References Cited

U.S. PATENT DOCUMENTS

2014/0301474 A1    10/2014  Guo et al.
2016/0100184 A1*   4/2016   Liu ........................ H04N 19/50
                                                                382/166

OTHER PUBLICATIONS

International Search Report dated Feb. 15, 2016, issued in application No. PCT/CN2015/094004.

(Continued)

*Primary Examiner* — Jonathan Messmore
(74) *Attorney, Agent, or Firm* — McClure, Qualey & Rodack, LLP

(57) ABSTRACT

A method of palette coding to apply the palette coding to sub-blocks of a coding unit and to allow each sub-block to use an individual palette table is disclosed. If the current coding block is not partitioned, the palette coding is applied to the current coding block using a first palette. If the current coding block is partitioned into multiple sub-blocks, the palette coding is applied to each sub-block using an individual second palette. Each sub-block may correspond to one prediction unit (PU). In another embodiment of the present invention, a method is disclosed that skips update of palette predictor such as last coded palette table, last coded palette size and palette predictor size associated with the current coding block if the current palette size is smaller than or equal to palette update size.

5 Claims, 3 Drawing Sheets

(56) References Cited

OTHER PUBLICATIONS

Wang, W., et al.; "Non-CE6: Index Coding Group (ICG) for 8x8 CU of Palette Mode in HEVC SCC;" Joint Collaborative Team on Video Coding (JCT-VC) of ITU-T SG 16 WP 3 and ISO/IEC JTC 1/SC 29/WG 11; 19th Meeting: Strasbourg, FR; Oct. 17-24, 2014; Document: JCTVC-S0152; Oct. 2014; pp. 1-4.

Sun, Y.C., et al.; "AHG10: A triplet palette mode combining JCTVC-P0108 and JCTVC-P0198;" Joint Collaborative Team on Video Coding (JCT-VC) of ITU-T SG 16 WP 3 and ISO/IEC JTC 1/SC 291WG 11; 17th Meeting: Valencia, ES; Mar.-Apr. 2014; Document: JCTVC-Q0083; pp. 1-9.

Seregin, V., et al.; "Non-SCCE3: Palette predictor resetting;" Joint Collaborative Team on Video Coding (JCT-VC) of ITU-T SG 16 WP 3 and ISO/IEC JTC 1/SC 29/WG 11; 18th Meeting: Sapporo, JP; Jun.-Jul. 2014; Document: JCTVC-R0229; pp. 1-4.

Guo, L., et al.; "Color palette for screen content coding;" IEEE; 2014; pp. 5556-5560.

Lai, P.L., et al.;"Description of screen content coding technology proposal by MediaTek;" Joint Collaborative Team on Video Coding (JCT-VC) of ITU-T SG16 WP3 and ISO/IEC JTC2/SC29/WG11; Mar.-Apr. 2014; pp. 1-31.

"Report of the 107th meeting in San Joe, USA;" International Organisation for Standardisation; Jan. 2014; pp. 1-2.

\* cited by examiner

| | | | |
|---|---|---|---|
| ▨<br>↑CTU 00 | ... | ... | CTU 0n |
| ▨<br>CTU 10 | ... | ... | CTU 1n |
| ... | ... | ... | ... |
| CTU m0 | ... | ... | CTU mn |

*Fig. 2A*

| | | | |
|---|---|---|---|
| CTU 00<br>▨ | ... | ... | CTU 0n |
| ▨→<br>CTU 10 | ... | ... | CTU 1n |
| ... | ... | ... | ... |
| CTU m0 | ... | ... | CTU mn |

*Fig. 2B*

| | | | |
|---|---|---|---|
| CT▨0 0<br>↑ | ... | ... | CTU 0n |
| ▨<br>CTU 10 | ... | ... | CTU 1n |
| ... | ... | ... | ... |
| CTU m0 | ... | ... | CTU mn |

*Fig. 2C*

METHOD FOR SUB-BLOCK BASED PALETTE CODING

CROSS REFERENCE TO RELATED APPLICATIONS

The present invention claims priority to U.S. Provisional Patent Application, Ser. No. 62/076,135, filed on Nov. 6, 2014 and U.S. Provisional Patent Application, Ser. No. 62/096,918, filed on Dec. 26, 2014. The U.S. Provisional Patent Applications are hereby incorporated by reference in their entireties.

FIELD OF INVENTION

The present invention relates to palette coding for video data. In particular, the present invention relates to palette coding by partitioning a coding block into multiple sub-blocks and applying palette coding to each sub-block using an individual palette. Furthermore, the present invention also discloses a process of updating the last coded palette table, last coded palette size, and palette predictor size conditionally depending on the current palette size.

BACKGROUND OF THE INVENTION

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include Range Extension (RExt) and screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

Current CU Syntax in RExt with Adoption of IntraBC

The IntraBC (Intra Block Copy) technique that was originally disclosed in JCTVC-M0350 (Budagavi et al., *AHG8. Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350) has been adopted into HEVC along with JCTVC-N0256 (Pang, et al. *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul. 2 Aug. 2013, Document: JCTVC-N0256). The adopted IntraBC method is signaled in coding unit syntax according to High Efficiency Video Coding (HEVC) Range Extension Text Specification: Draft 4 (Flynn, et al., "*High Efficiency Video Coding (HEVC) Range Extension Text Specification: Draft 4*", Joint Collaborative Team on Video Coding (JCT-VC) of ITU-T SG 16 WP 3 and ISO/IEC JTC 1/SC 29/WG 11, 14th Meeting: Vienna, AT, 25 Jul. -2 Aug. 2013, Document: JCTVC-N1005). Table 1 shows the coding unit syntax for IntraBC as disclosed in JCTVC-N1005.

TABLE 1

|  | Note |
|---|---|
| coding_unit( x0, y0, log2CbSize ) { | |
|   if( transquant_bypass_enabled_flag ) | |
|     cu_transquant_bypass_flag | |
|   if( slice_type != I ) | |
|     cu_skip_flag[ x0 ][ y0 ] | |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | (1-1) |
|       intra_bc_flag[ x0 ][ y0 ] | (1-2) |
|     if( !intra_bc_flag[ x0 ][ y0 ] ) { | (1-3) |
|       if( slice_type != I ) | (1-4) |
|         pred_mode_flag | (1-5) |
|       if( CuPredMode[ x0 ][ y0 ] != MODE_INTRA \|\| | (1-6) |
|         log2CbSize = = MinCbLog2SizeY ) | |
|         part_mode | (1-7) |
|     } | |
|     ...... | |

As shown in Table 1, when IntraBC is enabled as indicated by Note (1-1), intra_bc_flag is signaled as indicated by Note (1-2). If intra_bc_flag is not equal to 1 as indicated by Note (1-3), whether the slice is not an I-slice is checked as indicated by Note (1-4). If so, pred_mode_flag is signaled as indicated by Note (1-5). Furthermore, whether the current prediction is not Intra mode or whether the current CU is the smallest CU (SCU) is checked as indicated by Note (1-6). If so, part_mode is signaled to indicate the partition mode as indicated by Note (1-7).

Major-Color-Based (or Palette) Coding Techniques

Two palette coding techniques have been evaluated in RExt core experiments. The first one is disclosed I JCTVC-O0182 (Guo et al., *Evaluation of Palette Mode Coding on HM-12.0+RExt-4.1*, Joint Collaborative Team on Video Coding (JCT-VC) of ITU-T SG 16 WP 3 and ISO/IEC JTC 1/SC 29/WG11, 15th Meeting: Geneva, CH, 23 Oct.-1 Nov. 2013, Document: JCTVC-O0218), where a very simple but efficient histogram based algorithm is used to classify the pixels. In specific, the most significant N peak values in the histogram are selected as major colors, as shown in FIG. 1. For lossy coding, the pixel values that are close to a major color are quantized to a major color. For example, in FIG. 1, the quantization step is q, and the quantization zone around a major color, i.e. between the two dotted lines, is 2q. In other words, any pixel value between the two quantization levels is quantized to the representative major color and the selected major color is identified by a corresponding major color index. Other pixels that do not belong to any major color sets are named escape pixels or escape colors, which may also be quantized before coding. For lossless coding, none of the quantization processes is used. For each pixel, a color index is assigned to indicate which color set it belongs to. If N major colors are used, the values from 0 to (N−1) are used as indices for the N major sets and the largest index value (i.e., index N) is used to indicate the pixel belonging to the escape pixel set.

After classification, the pixels of a block can be converted into color indices. Then, a predictive coding method is applied to the indices, where a pixel line can be predicted by different modes. In specific, three kinds of line modes are used for a pixel line, i.e. horizontal mode, vertical mode and normal mode. In the horizontal mode, all the pixels in the same line have the same value. If the value is the same as the first pixel of the above pixel line, only line mode signaling bits are transmitted. Otherwise, the index value is also transmitted. In the vertical mode, the current pixel line is the same as the above pixel line. Therefore, only line mode signaling bits are transmitted. In normal mode, pixels in a line are predicted individually. For each pixel, the left or above neighbor is used as a predictor, and the prediction symbol is transmitted to the decoder.

The second variant of palette coding technique is disclosed in JCTVC-N0249 (Guo, et al., "*Non-RCE*3: *Modified Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0249). The differences with the first approach are (1) "pixel mode" is removed and all the pixel values are converted to palette indices for encoding, (2) the possible error (from pixel values to palette indices) is encoded using the HEVC residue coding method, and (3) the palette index and the "run" are shared by all three color components.

All previously proposed palette coding techniques are applied to coding units, i.e. the palette coding process and signaling are at the CU level. For example, the CU syntax for JCTVC-00182 and JCTVC-N0249 is illustrated in Table 2.

TABLE 2

| | Note |
|---|---|
| coding_unit( x0, y0, log2CbSize ) { | |
|   if( transquant_bypass_enabled_flag ) | |
|     cu_transquant_bypass_flag | |
|   palette_mode_flag | |
|   if (palette_mode_flag) { | |
|     ...... | |
|   } | |
|   if( slice_type != I ) | |
|     cu_skip_flag[ x0 ][ y0 ] | |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | |
|       intra_bc_flag[ x0 ][ y0 ] | |
|     if( !intra_bc_flag[ x0 ][ y0 ] ) { | |
|       if( slice_type != I) | |
|         pred_mode_flag | |
|       if( CuPredMode[ x0 ][ y0 ] != MODE_INTRA \|\| | |
|         log2CbSize = = MinCbLog2SizeY ) | |
|         part_mode | |
|     { | |
|     ...... | |

Palette Coding

Palette coding mode has been included in HEVC Screen Content Coding, JCTVC-R-1005 (Joshi, et al., *High Efficiency Video Coding (HEVC) Screen Content Coding: Draft 1*, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1005). According to JCTVC-R1005, a palette is utilized to represent a given video block (e.g. CU) with limited number of values. Some related terms are illustrated as follows.

1. Palette table: A mapping table to map from a pixel value to an index
2. Color index map: Mapped pixel indices associated with values in the current block
3. Palette predictor: In SCM-3.0 (Joshi, et al., *Screen content coding test model 3(SCM 3)*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1014), the palette table of last coded palette CU is used as predictor for current palette table coding. In palette table coding, a palette_share_flag is first signaled. If palette_share_flag is 1, all the palette colors in the last coded palette table are reused for the current CU. The current palette size is also equal to the palette size of last coded palette CU. Otherwise (i.e., palette_share_flag being 0), the current palette table is signaled by choosing which palette colors in the last coded palette table can be reused, or by transmitting new palette colors. The size of the current palette is set to the size of the predicted palette (i.e., numPredPreviousPalette) plus the size of the transmitted palette (i.e., num_signaled_palette_entries). The predicted palette is a palette derived from the previously reconstructed palette coded CUs. The last used palette size and the palette predictor size will be updated each time when palette mode is enabled. When coding the current CU as palette mode, those palette colors which are not predicted using the predicted palette are directly transmitted into the bitstream.

The decoding and parsing processes according to JCTVC-R0348 (Onno, et al, "*Suggested combined software and text for run-based palette mode*", Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R0348) are briefly described as follows.

1. Signaling of the palette:
1.1 Signal "palette sharing flag" first, which indicates whether the palette predictor is used as the current palette. If it is true, the following processes in step 1.2 to 1.4 are skipped.
1.2 Signal "reused flags" to indicate which elements of the palette predictor are used in the current palette.
1.3 Signal 'number of non-predicted elements' which indicate how many elements in current palette are not predicted from the palette predictor.
1.4 Signal the value of each non-predicted element.
2. Signaling of the color index map:
2.1 The pixels in the block can be coded in horizontal raster scan order, vertical raster order, horizontal traverse scan order or vertical traverse order.
2.2 For each position, a flag is first transmitted to indicate which prediction mode between "copy above mode" and "new run mode" is being used.
2.3 When "copy above mode" is used, "number of runs" follows the flag. For the number of runs, the indices are the same as those in above line along the scan order.
2.4 When "new run mode" is used, "index" is signaled after the flag.
2.4.1 When the "index" is "ESCAPE", the pixel value itself is signaled.
2.4.2 When the "index" is in the palette table, "number of runs" is signaled. For the number of runs, the indices are same as the index signaled.

It is desirable to improve the coding efficiency associated with color index map coding.

SUMMARY OF THE INVENTION

A method of palette coding to apply the palette coding to sub-blocks of a coding unit and to allow each sub-block to use an individual palette table is disclosed. If the current coding block is not partitioned, the palette coding is applied to the current coding block using a first palette. If the current coding block is partitioned into multiple sub-blocks, the palette coding is applied to each sub-block using an individual second palette. Each sub-block may correspond to one prediction unit (PU).

In one embodiment, when the block size of the current coding block corresponds to 2N×2N, block size of each sub-block corresponds to 2N×M or M×2N, where M and N are positive integers and M is smaller than or equal to N. A set of codewords corresponding to {1, 01, 00} or an equivalent set of codewords can be used for binarization of partition mode selection among 2N×2N, 2N×M and M×2N.

In another embodiment, when the block size of the current coding block corresponds to 2N×2N, block size of each sub-block corresponds to 2N×N, N×2N or N×N, where N is a positive integer. A set of codewords corresponding to {1, 01, 001, 000} or an equivalent set of codewords can be used for binarization of partition mode selection among 2N×2N, 2N×N, N×2N and N×N. In one embodiment, N×N partition mode is only allowed for the current coding block being a SCU (smallest coding unit). For the current coding block larger than the SCU, a set of codewords corresponding to {1, 01, 00} or an equivalent set of codewords can be used for binarization of partition mode selection among 2N×2N, 2N×N and N×2N. In another embodiment, N×N partition mode is only allowed for the current coding block being a SCU (smallest coding unit) and the SCU is larger than 8×8. For the current coding block larger than the SCU or the current coding block being the SCU and the SCU corresponds to 8×8, a set of codewords corresponding to {1, 01, 00} or an equivalent set of codewords can be used for binarization of partition mode selection among 2N×2N, 2N×N and N×2N.

In yet another embodiment, when the block size of the current coding block corresponds to 2N×2N, the block size of each sub-block may correspond to 2N×N, N×2N or N×N if the current coding block is a SCU (smallest coding unit), and the block size of each sub-block may correspond to 2N×N, N×2N, M×2N or 2N×M if the current coding block is larger than the SCU, where M and N are positive integers and M is smaller than or equal to N. If the current coding block is the SCU, a set of codewords corresponding to {1, 01, 001, 000} or an equivalent set of codewords can be used for binarization of partition mode selection among 2N×2N, 2N×N, N×2N and N×N, and if the current coding block larger than the SCU, a set of codewords corresponding to {1, 011, 001, 010, 000} or an equivalent set of codewords is used for binarization of partition mode selection among 2N×2N, 2N×N, N×2N, 2N×M and M×2N.

In yet another embodiment, when block size of the current coding block corresponds to 2N×2N, block size of each sub-block may correspond to 2N×N, N×2N or N×N if the current coding block is a SCU (smallest coding unit), and block size of each sub-block may correspond to 2N×N or N×2N, or asymmetric partition 2N×nU, 2N×nD, nL×2N and nR×2N if the current coding block is larger than the SCU, where N is a positive integer, nU refers to narrower upper partition, nD refers to narrower lower partition, nL refers to narrower left partition, and nR refers to narrower right partition. If the current coding block is the SCU, a set of codewords corresponding to {1, 01, 001, 000} or an equivalent set of codewords can be used for binarization of partition mode selection among 2N×2N, 2N×N, N×2N and N×N, and if the current coding block larger than the SCU, a set of codewords corresponding to {1, 011, 001, 0100, 0101, 0000, 0001} or an equivalent set of codewords can be used for binarization of partition mode selection among 2N×2N, 2N×N, N×2N, 2N×nU, 2N×nD, nL×2N and nR×2N.

In one embodiment, the individual second palette of a current sub-block can be predicted from the individual second palette of a neighboring sub-block of the current sub-block. In another embodiment, multiple sub-blocks are allowed only if a number of major colors in the first palette is smaller than a selected number from one to a maximum palette size for the current coding block.

In yet another embodiment, prediction mode syntax is signaled to indicate a prediction mode for the current coding block, where the prediction mode is selected from a prediction mode group comprising palette coding mode and at least another prediction mode. For example, if either Intra Block Copy mode or the palette coding mode is enabled, and the current coding block is in an Intra slice, a one-bit code can be signaled to indicate whether Intra mode or one of the Intra Block Copy mode and the palette coding mode is used for the current coding block. In another example, if either Intra Block Copy mode or the palette coding mode is enabled, and the current coding block is not in an Intra slice, a set of codewords corresponding to {1, 01, 00} or an equivalent set of codewords can be used for binarization of prediction mode selection among Inter mode, Intra mode and one of the Intra Block Copy mode and the palette coding mode. In yet another example, if both Intra Block Copy mode and the palette coding mode is enabled, and the current coding block is not in an Intra slice, a set of codewords corresponding to {1, 01, 001, 000} or an equivalent set of codewords can be used for binarization of prediction mode selection among Inter mode, Intra mode, the Intra Block Copy mode and the palette coding mode.

In one embodiment, a syntax flag is signaled in sequence parameter set (SPS) to indicate whether non-square palette coding partition is allowed, whether asymmetric palette coding partitions is allowed, whether more than two partitions are allowed, or a number of partitions that the current coding block is split into.

In another embodiment of the present invention, a method is disclosed that skips update of palette predictor associated with the current coding block if the current palette size is smaller than or equal to palette update size. The updating of the palette predictor further comprises updating of last coded palette table, last coded palette size, and palette predictor size. The value of the palette update size can be signaled in sequence parameter set (SPS) or picture parameter set (PPS). The palette predictor is updated according to a coded palette of a previous coding block in an upper coding tree unit (CTU), in which the previous coding block is a first coding block in the upper CTU, a last coding block in the upper CTU, or a predefined coding block in the upper CTU.

In yet another embodiment of the present invention, a method is disclosed that encodes or decodes a current palette of the current coding block using a default palette predictor with default palette entry values if the current coding block corresponds to a beginning coding block of a current slice. Furthermore, if the current coding block corresponds to a beginning coding block of a current slice, a default last used palette size and a default palette predictor size are used.

BRIEF DESCRIPTION OF THE DRAWINGS

FIG. 2A illustrates an example according to an embodiment, where the last coded palette is the first CU palette in the starting CTU of the upper CTU row.

FIG. 2B illustrates an example according to an embodiment, where the last coded palette is the last CU palette in the starting CTU of the upper CTU row.

FIG. 2C illustrates an example according to this embodiment, where the last coded palette is any CU palette in a specified position of the starting CTU of the upper CTU row.

DETAILED DESCRIPTION

Figure 1:
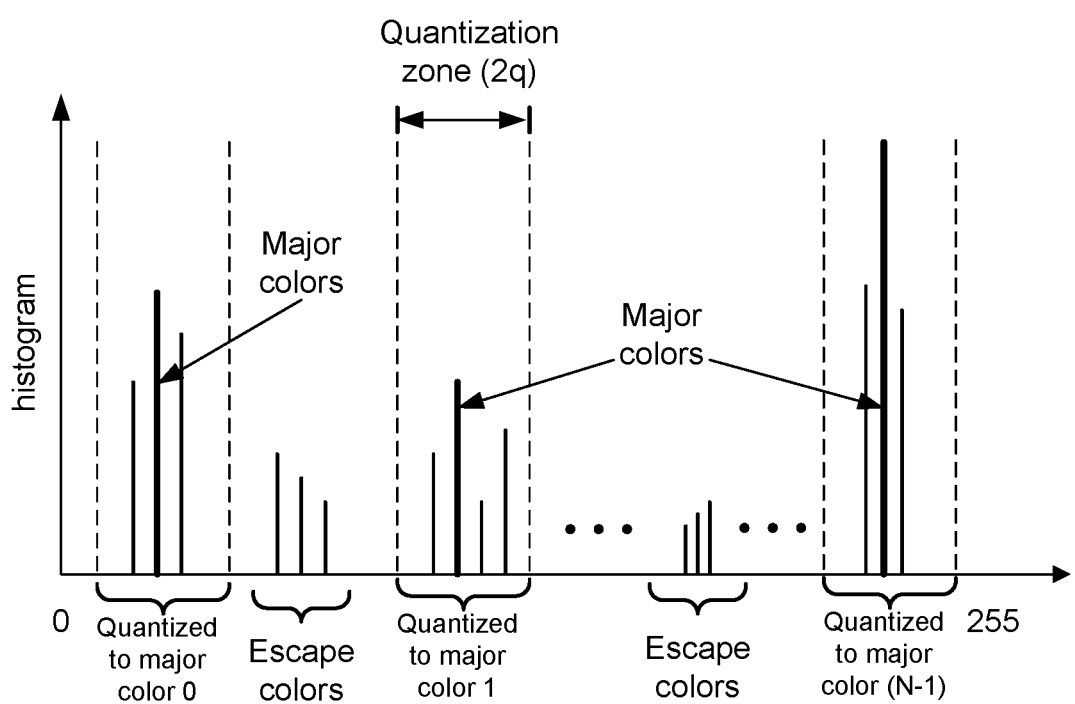
FIG. 1 illustrates an example of major color derivation by using color classification based on histogram of colors in a block.

In the present invention, various techniques to improve the performance of palette coding are disclosed. In particular, a sub-block based palette coding is disclosed, which allows palette coding applied to sub-blocks of a current block and allows each sub-block uses its own palette table. For example, instead of applying palette coding to each coding unit as required by the conventional approach, the present invention allows palette coding to be applied to each prediction unit (PU). As known for HEVC, each CU can be partitioned into one or more PUs for the prediction process. According to another embodiment of the present invention, the use of quantization matrices for palette coded blocks can be skipped, especially when residuals are not transformed into frequency domain. In yet another embodiment, a set of CU syntax for signaling the palette prediction mode together with other prediction modes such as Inter, Intra and IntraBC is disclosed.

Palette Coding for Prediction Units

In this embodiment, the palette coding technique is applied to sub-coding-units, such as prediction units as specified in HEVC and its extensions. According to HEVC, each CU can be split into one or more sub-blocks, named PUs. Accordingly, when the CU is predicted or compressed by the palette coding method, the CU will be partitioned into one or more sub-blocks (e.g. PUs) and each sub-block will have a palette (or a set of major colors). On the other hand, according to the conventional approach, palette coding is restricted to CUs and each CU has only one palette (or a set of major colors).

For example, a CU may be split into two sub-blocks (e.g. PUs) and when palette coding is selected as the prediction mode for the CU according to an embodiment of the present invention, exemplary binarization of the partition mode syntax (i.e., part mode) is shown in Table 3 and Table 4.

TABLE 3

| part_mode | PartMode | Bin string |
|---|---|---|
| 0 | PART_2N×2N | 1 |
| 1 | PART_2N×M | 01 |
| 2 | PART_M×2N | 00 |

TABLE 4

| part_mode | PartMode | Bin string |
|---|---|---|
| 0 | PART_2N×2N | 1 |
| 1 | PART_M×2N | 01 |
| 2 | PART_2N×M | 00 |

In Table 3 and Table 4, M and N are positive integers. In one example, M is equal to N. In another example, M is a power-of-2 integer, but less than or equal to N. Also, in Table 3 and Table 4, the set of codewords {1, 01, 00} is used as an example. However, a person skilled in the art may design an equivalent set of codewords that will result in the same coding efficiency. For example, the "0" and "1" in the set of codewords can be switched to result in an equivalent set of codewords {0, 10, 11}. Therefore, the present invention is not limited to the specific exemplary set of codewords, which is also applicable to other examples in this disclosure.

In another embodiment, palette coding can be applied to N×N partitions, such as in N×N Intra prediction. Each N×N partition has its own palette and there are four palettes per CU that need to be searched and signaled. Together with 2N×M and M×2N partition modes, exemplary binarization of part mode is shown in Table 5 and Table 6 when palette coding is used for the CU. For illustration purpose, M is equal to N in Table 5 and Table 6.

TABLE 5

| part_mode | PartMode | Bin string |
|---|---|---|
| 0 | PART_2N×2N | 1 |
| 1 | PART_2N×N | 01 |
| 2 | PART_N×2N | 001 |
| 3 | PART_N×N | 000 |

TABLE 6

| part_mode | PartMode | Bin string |
|---|---|---|
| 0 | PART_2N×2N | 1 |
| 1 | PART_N×2N | 01 |
| 2 | PART_2N×N | 001 |
| 3 | PART_N×N | 000 |

In yet another embodiment, the N×N partition for palette coding is only allowed when the CU is a SCU (smallest CU). Exemplary binarization of part mode when palette coding is used for the CU is shown in Table 7 and Table 8.

TABLE 7

| | | Bin string | |
|---|---|---|---|
| part_mode | PartMode | log2CbSize > MinCbLog2SizeY | log2CbSize = = MinCbLog2SizeY |
| 0 | PART_2N×2N | 1 | 1 |
| 1 | PART_2N×N | 01 | 01 |
| 2 | PART_N×2N | 00 | 001 |
| 3 | PART_N×N | | 000 |

TABLE 8

| part_mode | PartMode | Bin string | |
|---|---|---|---|
| | | log2CbSize > MinCbLog2SizeY | log2CbSize == MinCbLog2SizeY |
| 0 | PART_2Nx2N | 1 | 1 |
| 1 | PART_Nx2N | 01 | 01 |
| 2 | PART_2NxN | 00 | 001 |
| 3 | PART_NxN | | 000 |

In yet another embodiment, NxN partition is only allowed when the palette coding CU size is greater than 8x8. That is equivalent to the smallest N being greater than 4. Exemplary binarization of part mode when palette coding is used for the CU is shown in Table 9 and Table 10.

TABLE 9

| part_mode | PartMode | Bin string | |
|---|---|---|---|
| | | log2CbSize > MinCbLog2SizeY \|\| log2CbSize == MinCbLog2SizeY && log2CbSize == 3 | log2CbSize == MinCbLog2SizeY && log2CbSize > 3 |
| 0 | PART_2Nx2N | 1 | 1 |
| 1 | PART_2NxN | 01 | 01 |
| 2 | PART_Nx2N | 00 | 001 |
| 3 | PART_NxN | | 000 |

TABLE 10

| part_mode | PartMode | Bin string | |
|---|---|---|---|
| | | log2CbSize > MinCbLog2SizeY \|\|log2CbSize == MinCbLog2SizeY && log2CbSize == 3 | log2CbSize == MinCbLog2SizeY && log2CbSize > 3 |
| 0 | PART_2Nx2N | 1 | 1 |
| 1 | PART_Nx2N | 01 | 01 |
| 2 | PART_2NxN | 00 | 001 |
| 3 | PART_NxN | | 000 |

In yet another embodiment, NxN partition mode is allowed while 2NxN and Nx2N partition modes are not allowed for palette coding mode. Exemplary binarization of part mode when palette coding is used for the CU is shown in Table 11.

TABLE 11

| part_mode | PartMode | Bin string | |
|---|---|---|---|
| | | log2CbSize > MinCbLog2SizeY | log2CbSize == MinCbLog2SizeY |
| 0 | PART_2Nx2N | — | 1 |
| 1 | PART_NxN | — | 0 |

In yet another embodiment, palette coding is allowed for 2Nx2N, 2NxN, Nx2N, 2NxM and Mx2N partitions simultaneously. In one example, M is equal to (N/2). In another example, M is a power-of-2 integer less than N. Exemplary binarization of part mode when palette_mode_flag equal to 1 is shown in Table 12 and Table 13. In this case, a 2Nx2N palette coded (major-color coded) CU is evenly split into (2N/M) partitions, either in the vertical direction (i.e. 2NxM mode) or in the horizontal direction (i.e. Mx2N mode). Each 2NxM or Mx2N partition uses its own palette. Therefore, there are 2N/M palettes per CU that need to be signaled. In one example, when M is equal to N/2 and either 2Nx(N/2) partition mode or (N/2)x2N partition mode is selected, the 2Nx2N IntraBC CU is evenly split into four 2Nx(N/2) or (N/2)x2N partitions, respectively. Each 2Nx(N/2) or (N/2)x 2N partition is compressed by palette coding method with its own palette.

TABLE 12

| part_mode | PartMode | Bin string | |
|---|---|---|---|
| | | log2CbSize > MinCbLog2SizeY | log2CbSize == MinCbLog2SizeY |
| 0 | PART_2Nx2N | 1 | 1 |
| 1 | PART_2NxN | 011 | 01 |
| 2 | PART_Nx2N | 001 | 001 |
| 3 | PART_NxN | | 000 |
| 4 | PART_2NxM | 010 | |
| 5 | PART_Mx2N | 000 | |

TABLE 13

| part_mode | PartMode | Bin string | |
|---|---|---|---|
| | | log2CbSize > MinCbLog2SizeY | log2CbSize == MinCbLog2SizeY |
| 0 | PART_2Nx2N | 1 | 1 |
| 1 | PART_Nx2N | 011 | 01 |
| 2 | PART_2NxN | 001 | 001 |
| 3 | PART_NxN | | 000 |
| 4 | PART_Mx2N | 010 | |
| 5 | PART_2NxM | 000 | |

In yet another embodiment, palette coding is also allowed for asymmetric partitions. For example, partition modes PART_2NxnU, PART_2NxnD, PART_nLx2N and PART_nRx2N similar to the AMP (Asymmetric Motion Partition) modes in HEVC Inter prediction are allowed for a 2Nx2N palette (or major-color) coded CU. The definitions of PART_2NxnU, PART_2NxnD, PART_nLx2N and PART_nRx2N can be the same as the definitions of those partition modes for HEVC Inter prediction when AMP is enabled. The 2NxnU partition refers to vertical partition with narrower upper partition. Similarly, 2NxnD refers to vertical partition with narrower lower partition; nLx2N refers to horizontal partition with narrower left partition; and nRx2N refers to horizontal partition with narrower right partition. In another example, nU, nD, nL and nR can be any power-of-2 integer less than N. Exemplary binarization of part_mode when palette coding is used for the CU is shown in Table 14 and Table 15. In this case, each 2NxnU, 2NxnD, nLx2N or nRx2N partition is palette coded using its own palette, and there are two palettes per CU that need to be signaled.

TABLE 14

| part_mode | PartMode | Bin string | |
|---|---|---|---|
| | | log2CbSize > MinCbLog2SizeY | log2CbSize == MinCbLog2SizeY |
| 0 | PART_2Nx2N | 1 | 1 |
| 1 | PART_2NxN | 011 | 01 |
| 2 | PART_Nx2N | 001 | 001 |
| 3 | PART_NxN | | 000 |
| 4 | PART_2NxnU | 0100 | |

TABLE 14-continued

| part_mode | PartMode | Bin string log2CbSize > MinCbLog2SizeY | log2CbSize == MinCbLog2SizeY |
|---|---|---|---|
| 5 | PART_2NxnD | 0101 | |
| 6 | PART_nLx2N | 0000 | |
| 7 | PART_nRx2N | 0001 | |

TABLE 15

| part_mode | PartMode | Bin string log2CbSize > MinCbLog2SizeY | log2CbSize == MinCbLog2SizeY |
|---|---|---|---|
| 0 | PART_2Nx2N | 1 | 1 |
| 1 | PART_Nx2N | 011 | 01 |
| 2 | PART_2NxN | 001 | 001 |
| 3 | PART_NxN | | 000 |
| 4 | PART_nLx2N | 0100 | |
| 5 | PART_nRx2N | 0101 | |
| 6 | PART_2NxnU | 0000 | |
| 7 | PART_2NxnD | 0001 | |

In the above embodiments as illustrated in Tables 3-15, the palette of each PU (or sub-block of CU) may be predicted from the palettes of previous PUs within one CU or in a neighboring CU in coding order. The palette of each PU may also be predicted from left neighboring blocks or above neighboring blocks.

In the above embodiments, the number of major color for the palette coded PUs can be smaller than L, where L is in the range from 1 to maximum palette size. L can be signaled at high level syntax or pre-defined.

In another embodiment, when the current CU is split into N+1 sub-blocks and N is an integer larger than or equal to 2, at most N sub-blocks can share the same palette table (or a set of major colors). Each of the rest sub-blocks may have individual palette table (or a set of major colors).

In yet another embodiment, for a current CU split into multiple sub-blocks, at least one sub-block of the current CU is predicted or compressed by the palette coding method, while the rest of the sub-blocks are predicted or compressed by Inter prediction, Intra prediction, or Intra block copy (IntraBC). Each sub-block coded using the palette coding method has individual palette table.

Process of Applying Scaling List (Quantization Matrices) to Palette Coded Blocks In another embodiment of the present invention, the use of quantization matrices (or scaling lists) is skipped for palette coded blocks if the residuals of the palette coded blocks are not transformed into frequency domain.

Palette Coding Signaling in CU Syntax

In another embodiment of the present invention, signaling prediction mode including Inter, Intra, Intra block copy (IntraBC) and palette coding in CU syntax is disclosed. As shown in Table 16, the change of CU syntax made to the CU syntax based on HEVC is minor. However the parsing process and the semantics to some syntax elements (e.g. pred_mode_flag) also need to be changed. In Table 16, the statement "if(slice_type !=I)" is moved from the original location as indicated by Note (16-2) to the new location as indicated by Note (16-1). In the exemplary CU syntax incorporating an embodiment of the present invention as shown in Table 16, both palette coding and IntraBC coding are considered as a coding mode for an Intra slice (i.e., I-slice). However, the present invention is not limited to the specific syntax nor specific semantics.

TABLE 16

| coding_unit( x0, y0, log2CbSize ) { | Note |
|---|---|
| if( transquant_bypass_enabled_flag ) | |
|   cu_transquant_bypass_flag | |
| if( slice_type != I ) | (16-1) |
|   cu_skip_flag[ x0 ][ y0 ] | |
| nCbS = ( 1 << log2CbSize ) | |
| if( cu_skip_flag[ x0 ][ y0 ] ) | |
|   prediction_unit( x0, y0, nCbS, nCbS ) | |
| else { | |
|   ~~if( slice_type != I )~~ | (16-2) |
|   pred_mode_flag | |
|   if( CuPredMode[ x0 ][ y0 ] != MODE_INTRA \|\| | |
|     log2CbSize == MinCbLog2SizeY ) | |
|   part_mode | |
| } | |
| ...... | |

In one embodiment, when both intra_block_copy_enable_flag is equal to 1 (i.e. Intra block copy is enabled) and palette coding is enabled, and when the slice_type is not Intra (i.e. slice_type !=I), the binarization of Inter, Intra, Intra_block_copy and palette coding modes can be 10, 11, 01 and 00 respectively. Other mapping between the modes and codewords may also be used. When the slice_type is Intra, the binarization of Intra, Intra_block_copy and palette coding modes can be 1, 01 and 00 respectively. Other mapping between the modes and codewords may also be used. If only one of the Intra block copy and palette coding modes is enabled, codewords 1 and 0 can be used to specify the use of Intra mode or Intra block copy/palette coding mode for an Intra slice. For non-Intra slice, 1, 01 and 00 can be used to specify the use of Inter, Intra and Intra block copy/palette coding mode respectively. Other mapping between the modes and codewords may also be used.

In another embodiment, when Intra_block_copy_enabled_flag is equal to 1 (i.e. intra block copy is enabled) and palette coding is enabled, and when the slice_type is not Intra (i.e. slice_type !=I), the binarization of Inter, Intra, Intra_block_copy and palette_coding modes can be 1, 01, 001 and 000 respectively. In other words, the first bit (or bin) is used to specify whether the prediction mode is Inter, or one of the Intra picture prediction modes, i.e. Intra, Intra block copy or palette coding. Other mapping between the set of codewords (i.e., 1, 01, 001 and 000) and the set of modes (Inter, Intra, Intra block copy and palette coding) can also be used. Furthermore, other variable-length codewords other than {1, 01, 001 and 000} can also be used.

The methods disclosed above can be combined. For example, palette coding is applied to the PUs of a CU and the palette coding signaling in CU syntax as shown in Table 16 is also applied.

Palette Coding High Level Syntax

In one embodiment of the present invention, high level syntax flags are used to enable and disable sub-coding-block based palette coding in the sequence level, picture level, slice level or a combination thereof.

For example, a SPS (sequence parameter set) flag (e.g. "non_square_palette_enabled_" flag) can be used to specify whether non-square palette coding partitions may be applied to this sequence. Exemplary syntax and semantics are shown in Table 17.

TABLE 17

| seq_parameter_set_rbsp( ) { | Note |
|---|---|
| ...... | |
| sps_extension1_flag | |
| if( sps_extension1_flag ) { | |
|   transform_skip_rotation_enabled_flag | |
|   transform_skip_context_enabled_flag | |
|   intra_block_copy_enabled_flag | |
|   palette_coding_enabled_flag | (17-1) |
|   if( palette_coding_enabled_flag) | (17-2) |
|     non_square_palette_enabled_flag | (17-3) |
|   residual_dpcm_intra_enabled_flag | |
|   residual_dpcm_inter_enabled_flag | |
|   extended_precision_processing_flag | |
|   intra_smoothing_disabled_flag | |
|   sps_extension2_flag | |
| } | |
| ...... | |
| } | | non_square_palette_enabled_flag equal to 1 specifies that non-square partitions may be used in palette coding tree blocks. non_square_palette_enabled_flag equal to 0 specifies that non-square partitions cannot be used in palette coding tree blocks. In Table 17, palette_coding_enabled_flag in included as indicated by Note (17-1). If palette_coding_enabled_flag is 1 as indicated by Note (17-2), non_square_palette_enabled_flag is included as indicated by Note (17-3).

In another embodiment, a SPS (sequence parameter set) flag (e.g. asymmetric_palette_enabled_flag) is signaled to specify whether asymmetric palette coding partitions may be applied to this sequence. Exemplary syntax and semantics are shown in Table 18.

TABLE 18

| seq_parameter_set_rbsp( ) { | Note |
|---|---|
| ...... | |
| sps_extension1_flag | |
| if( sps_extension1_flag ) { | |
|   transform_skip_rotation_enabled_flag | |
|   transform_skip_context_enabled_flag | |
|   intra_block_copy_enabled_flag | |
|   palette_coding_enabled_flag | (18-1) |
|   if(palette_coding_enabled_flag) { | (18-2) |
|     non_square_palette_enabled_flag | (18-3) |
|     if(non_square_palette_enabled_flag) | (18-4) |
|       asymmetric_palette_enabled_flag | (18-5) |
|   } | |
|   residual_dpcm_intra_enabled_flag | |
|   residual_dpcm_inter_enabled_flag | |
|   extended_precision_processing_flag | |
|   intra_smoothing_disabled_flag | |
|   sps_extension2_flag | |
| } | |
| ...... | |
| } | | asymmetric_palette_enabled_flag equal to 1 specifies that asymmetric partitions (such as partition mode equal to PART_2N×nU, PART_2N×nD, PART_nL×2N, or PART_nR×2N) may be used in palette coding tree blocks. asymmetric_palette_enabled_flag equal to 0 specifies that asymmetric partitions cannot be used in palette coding tree blocks. In Table 18, palette_coding_enabled_flag is included as shown in Note (18-1). If palette_coding_enabled_flag is 1 as shown in Note (18-2), non_square_palette_enabled_flag is included as shown in Note (18-3). If non_square_palette_enabled_flag is 1 as shown in Note (18-4), asymmetric_palette_enabled_flag is included as shown in Note (18-5).

In yet another embodiment, a SPS (sequence parameter set) flag (e.g. multi_part_palette_enabled_flag) is signaled to specify whether more than two partitions may be applied to one palette coded CU in this sequence. Exemplary syntax and semantics are shown in Table 19 and Table 20.

TABLE 19

| seq_parameter_set_rbsp( ) { | Note |
|---|---|
| ...... | |
| sps_extension1_flag | |
| if( sps_extension1_flag ) { | |
|   transform_skip_rotation_enabled_flag | |
|   transform_skip_context_enabled_flag | |
|   intra_block_copy_enabled_flag | |
|   palette_coding_enabled_flag | (18-1) |
|   if(palette_coding_enabled_flag) { | (18-2) |
|     non_square_palette_enabled_flag | (18-3) |
|     if(non_square_palette_enabled_flag) | (18-4) |
|       multi_part_palette_enabled_flag | (19-1) |
|   } | |
|   residual_dpcm_intra_enabled_flag | |
|   residual_dpcm_inter_enabled_flag | |
|   extended_precision_processing_flag | |
|   intra_smoothing_disabled_flag | |
|   sps_extension2_flag | |
| } | |
| ...... | |
| } | |

TABLE 20

| seq_parameter_set_rbsp( ) { | Note |
|---|---|
| ...... | |
| sps_extension1_flag | |
| if( sps_extension1_flag ) { | |
|   transform_skip_rotation_enabled_flag | |
|   transform_skip_context_enabled_flag | |
|   intra_block_copy_enabled_flag | |
|   palette_coding_enabled_flag | (18-1) |
|   if(palette_coding_enabled_flag) { | (18-2) |
|     multi_part_palette_enabled_flag | (20-1) |
|   residual_dpcm_intra_enabled_flag | |
|   residual_dpcm_inter_enabled_flag | |
|   extended_precision_processing_flag | |
|   intra_smoothing_disabled_flag | |
|   sps_extension2_flag | |
| } | |
| ...... | |
| } | | multi_part_palette_enabled_flag equal to 1 specifies that more than two partitions (i.e. 2N×M and M×2N, or 2N×(N/2) and (N/2)×2N) may be used in one palette coding tree block. multi_part_palette_enabled_flag equal to 0 specifies that no more than two partitions cannot be used in one palette coding tree block. Table 19 is similar to Table 18 except that the statement in Note (18-5) is replaced by the statement in Note (19-1). In other words, if non_square_palette_enabled_flag is 1, multi_part_palette_enabled_flag is included as shown in Note (19-1). Table 20 is substantially the same as Table 19 except that statement in Notes (18-3) and (18-4) are removed. In other words, multi_part_palette_enabled_flag is included as indicated in Note (20-1) if palette_coding_enabled_flag is equal to 1.

In another embodiment, a SPS (sequence parameter set) flag (e.g. log 2_num_part_ibc_minus2) is signaled to specify the number of partitions that the current palette coding unit is split into. Exemplary syntax and semantics are shown in Table 21.

TABLE 21

| seq_parameter_set_rbsp( ) { | Note |
|---|---|
| ...... | |
| sps_extension1_flag | |
| if( sps_extension1_flag ) { | |
|   transform_skip_rotation_enabled_flag | |
|   transform_skip_context_enabled_flag | |
|   intra_block_copy_enabled_flag | |
|   palette_coding_enabled_flag | (18-1) |
|   if(palette_coding_enabled_flag) { | (18-2) |
|     non_square_palette_enabled_flag | (18-3) |
|     if(non_square_palette_enabled_flag) | (18-4) |
|       multi_part_palette_enabled_flag | (19-1) |
|       if(multi_part_palette_enabled_flag) | (21-1) |
|         log2_num_part_palette_minus2 | (21-2) |
|     } | |
|   residual_dpcm_intra_enabled_flag | |
|   residual_dpcm_inter_enabled_flag | |
|   extended_precision_processing_flag | |
|   intra_smoothing_disabled_flag | |
|   sps_extension2_flag | |
| } | |
| ...... | |
| } | | log 2_num_part_palette_minus2 plus 2 specifies the value of the number of partitions in the palette coding unit as follows:

$$\text{NumPartitionPalette} = 2^{(log\ 2\_num\_part\_ibc+2)}.$$

Table 21 is substantially the same as Table 19 except that additional statements as indicated by Note (21-1) and (21-2) are included. According to the additional statements, log 2_num_part_palette_minus2 is included as indicated by Note (21-2) if multi_part_palette enabled_flag is equal to 1 as indicated by Note (21-1).

In another embodiment, the palette CU is evenly split into NumPartitionPalette partitions either in vertical or in horizontal direction.

Palette Predictor Update

Another aspect of the present invention addresses palette predictor update. According to one embodiment, when current palette_size is smaller than or equal to palette update size (e.g. PLT_UPDATE_SIZE), the update of palette predictor associated with the current coding block such as last coded palette table, last coded palette size, and palette predictor size can be skipped to simplify the update process. Table 22 illustrates exemplary palette coding syntax according to this embodiment. The value PLT_UPDATE_SIZE can be signaled in PPS (picture parameter set) or SPS (sequence parameter set). In one embodiment, the value of PLT_UPDATE_SIZE is 1, however, the present invention is not limited thereto.

TABLE 22

| palette_coding( x0, y0, nCbS ) { | Note |
|---|---|
| ... | |
| if (palette_size > PLT_UPDATE_SIZE) { | (22-1) |
|   previousPalette Size = palette_size | |
|   current_size = palette_size | |
|   for( i = 0; i < palette_size; i++ ) | |
|     for ( cIdx = 0; cIdx < 3; cIdx++ ) | |
|       tempPaletteEntries[ cIdx ][ i ] = palette_entries[ cIdx ][ i ] | |
|   for( i = 0; i < previousPaletteStuffingSize && current_size < max_palette_predictor_size; i++ ) | |
|     if( previous_palette_entry_flag[ i ] == 0 ) { | |
|       for ( cIdx = 0; cIdx < 3; cIdx++ ) | |
|         tempPaletteEntries[ cIdx ][ current_size ] = previousPaletteEntries[ cIdx ][ i ] | |

TABLE 22-continued

| palette_coding( x0, y0, nCbS ) { | Note |
|---|---|
|       current_size++ | |
|     } | |
|   previousPaletteStuffingSize = current_size | |
|   previousPaletteEntries = tempPaletteEntries | |
| } | |
| } | |

In another embodiment, when updating the palette predictor, the last palette table is redefined. For each starting CU of a CTU row, the last coded palette is, for example, the palette of the starting CU of the upper CTU row. FIG. 2A illustrates an example according to this embodiment, where the last coded palette is the first CU palette (210) in the starting CTU (i.e., CTU 00) of the upper CTU row. In FIG. 2A, the dot-filled square is the starting CU of the current CTU row, while the cross line-filled square is the starting CU of the upper CTU row.

FIG. 2B illustrates another example according to this embodiment, where the last coded palette is the palette of the last CU (also referred to as the last CU palette (220)) in the starting CTU (i.e., CTU 00) of the upper CTU row. In FIG. 2B, the dot-filled square is the starting CU of the current CTU row, while the cross line-filled square is the last CU in the starting CTU of the upper CTU row.

FIG. 2C illustrates yet another example according to this embodiment, where the last coded palette is the palette of any CU in a specified position of the starting CTU (i.e., CTU 00) of the upper CTU row. The position can be predefined or signal in PPS or SPS. In FIG. 2C, the dot-filled square is the starting CU of the current CTU row, while the cross line-filled square is the CU in the specified position of the starting CTU of the upper CTU row.

In the above example, the last coded palette will be inserted in the palette predictor, and the palette predictor will be updated accordingly.

In yet another embodiment, at the start of each slice, a default palette predictor can be used, which consists of default palette entry values. Furthermore, a default last used palette size and a default palette predictor size can be used.

Figure 3:
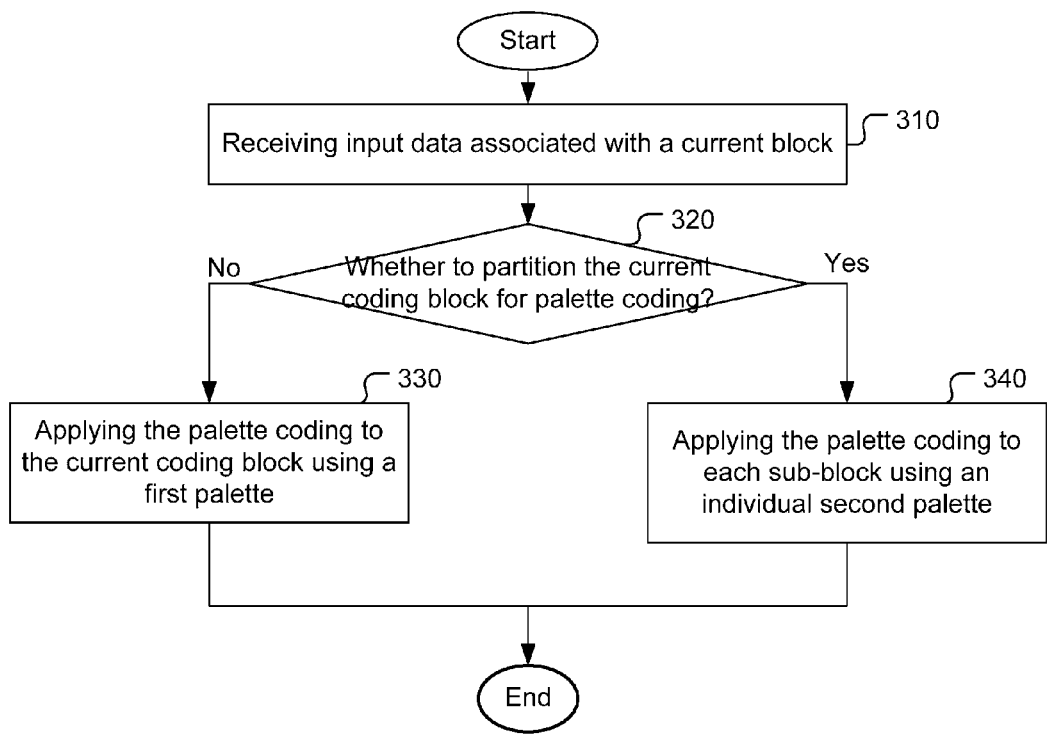
FIG. 3 illustrates an exemplary flowchart for a system using sub-block based palette coding according to an embodiment of the present invention.

FIG. 3 illustrates an exemplary flowchart of sub-block based palette coding according to an embodiment of the present invention. The system receives input data associated with a current coding block as shown in step 310. The input data, at an encoder side, may correspond to pixel values or indices of the current block. The input data, at a decoder side, may correspond to coded data of the current block. The input data may be retrieved from memory (e.g., computer memory, buffer (RAM or DRAM) or other media) or from a processor. Whether to partition the current coding block for palette coding is determined in step 320. If the current coding block is not partitioned (i.e., the "no" path from step 320), the palette coding is applied to the current coding block using a first palette as shown in step 330. If the current coding block is partitioned into multiple sub-blocks (i.e., the "yes" path from step 320), the palette coding is applied to each sub-block using an individual second palette as shown in step 340.

The flowchart shown is intended to illustrate an example of color index coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette coding, the method comprising:
receiving input data associated with a current coding block;
determining a current palette size for the current coding block;
if the current palette size is smaller than or equal to palette update size, skipping update of palette predictor associated with the current coding block; and
if the current palette size is greater than the palette update size, updating the palette predictor associated with the current coding block.

2. The method of claim 1, wherein value of the palette update size is signaled in sequence parameter set (SPS) or picture parameter set (PPS).

3. The method of claim 1, wherein updating of the palette predictor further comprising updating of last coded palette table, last coded palette size, and palette predictor size.

4. The method of claim 1, wherein the palette predictor is updated according to a coded palette of a previous coding block in an upper coding tree unit (CTU).

5. The method of claim 4, wherein the previous coding block is a first coding block in the upper CTU, a last coding block in the upper CTU, or a predefined coding block in the upper CTU.

* * * * *